US010915499B2

(12) United States Patent
Gaonkar et al.

(10) Patent No.: US 10,915,499 B2
(45) Date of Patent: Feb. 9, 2021

(54) FILESYSTEM DURABLE WRITE OPERATIONS TO CLOUD OBJECT STORAGE

(71) Applicant: Cisco Technology, Inc., San Jose, CA (US)

(72) Inventors: Shravan Gaonkar, Gainesville, FL (US); Mayuresh Vartak, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 161 days.

(21) Appl. No.: 16/058,426

(22) Filed: Aug. 8, 2018

(65) Prior Publication Data

US 2020/0050682 A1 Feb. 13, 2020

(51) Int. Cl.
*G06F 17/00* (2019.01)
*G06F 16/13* (2019.01)
*G06F 3/06* (2006.01)
*G06F 16/182* (2019.01)

(52) U.S. Cl.
CPC ............ *G06F 16/13* (2019.01); *G06F 3/0604* (2013.01); *G06F 3/067* (2013.01); *G06F 3/0659* (2013.01); *G06F 16/182* (2019.01)

(58) Field of Classification Search
CPC .......... G06F 16/13; G06F 16/182; G06F 3/06; G06F 3/067; G06F 3/0659; G06F 3/0604
See application file for complete search history.

(56) References Cited

U.S. PATENT DOCUMENTS

| 8,799,413 | B2  |   | 8/2014 | Taylor et al. |
| 9,325,802 | B2  | * | 4/2016 | Krishnaprasad .... H04L 67/2842 |
| 9,367,551 | B2  |   | 6/2016 | Beaverson et al. |
| 9,448,927 | B1  |   | 9/2016 | Agarwala et al. |

(Continued)

OTHER PUBLICATIONS

Y. Tao et al, "A Head Record Cache Structure to Improve the Operations on Big Files in Cloud Storage Servers," 2015 IEEE 17th International Conference on High Performance Computing and Communications, 2015 IEEE 7th International Symposium on Cyberspace Safety and Security, pp. 46-51, August (Year: 2015).*

(Continued)

*Primary Examiner* — Greta L Robinson
(74) *Attorney, Agent, or Firm* — Edell, Shapiro & Finnan, LLC

(57) ABSTRACT

Techniques for filesystem durable write operations to cloud object storage are described. In one embodiment, a method includes receiving at least one of a read operation or a write operation from a filesystem layer. The read operation identifies content stored in a distributed content object storage layer that is to be retrieved and the write operation identifies content that is to be stored to the distributed content object storage layer. The method includes converting the read operation into a get operation or the write operation into a put operation. The method further includes storing an index that maps the read or write operation to the get or put operation and includes an association between the content identified by the filesystem layer to objects in the distributed content object storage layer. The method includes sending the get or put operation to the distributed content object storage layer for the identified content.

20 Claims, 7 Drawing Sheets

(56) References Cited

U.S. PATENT DOCUMENTS

| | | | |
|---|---|---|---|
| 9,521,198 B1 | 12/2016 | Agarwala et al. | |
| 9,582,421 B1 | 2/2017 | Agarwala et al. | |
| 9,652,471 B1 | 5/2017 | Krishnan et al. | |
| 9,720,619 B1 | 8/2017 | Shah et al. | |
| 9,740,729 B2* | 8/2017 | Srinivasan | G06F 3/0608 |
| 9,965,203 B1 | 5/2018 | Agarwala et al. | |
| 10,031,679 B2* | 7/2018 | O'Hare | G06F 3/067 |
| 10,216,949 B1 | 2/2019 | McKelvie et al. | |
| 10,229,011 B2 | 3/2019 | Leshinsky et al. | |
| 10,303,564 B1 | 5/2019 | Gupta et al. | |
| 10,430,103 B1* | 10/2019 | Jamail | G06F 3/0619 |
| 10,474,656 B1 | 11/2019 | Bronnikov | |
| 2017/0132091 A1 | 5/2017 | Leshinsky et al. | |
| 2017/0249093 A1* | 8/2017 | Wang | G06F 3/0619 |
| 2018/0336231 A1* | 11/2018 | Gerrard | G06F 16/182 |

OTHER PUBLICATIONS

ASF Infrabot, "Durability", Apache Software Foundation, 2 pages, retrieved from Internet Aug. 6, 2020; https://cwiki.apache.org/confluence/display/CASSANDRA2/Durability.

Cisco, "Cisco HyperFlex Systems", Cisco Public, Jul. 2019, 22 pages; https://www.cisco.com/c/dam/en/us/products/collateral/hyperconverged-infrastructure/hyperflex-hx-series/solution-overview-c22-736815.pdf.

Kai Ren, "Fast Storage for File System Metadata", CMU-CS-17-121, Sep. 26, 2017, Submitted in partial fulfillment of the requirements for the degree of Doctor of Philosophy, School of Computer Science, Carnegie Mellon University, 165 pages.

Andres Levitski, "Building Distributed File Systems on Commercial Cloud Storage Services", University of Helsinki, Department of Computer Science, Jan. 5, 2016, 64 pages.

* cited by examiner

FILESYSTEM DURABLE WRITE OPERATIONS TO CLOUD OBJECT STORAGE

TECHNICAL FIELD

This disclosure relates generally to a distributed storage system.

BACKGROUND

A majority of cloud storage service providers offer cloud object stores (COS) that use an object-based storage architecture. Object-based storage architectures manage data as objects, as compared with other storage architectures, such as conventional file systems, which manage data, as a file hierarchy; and block storage, which manages data as blocks within sectors and tracks. As the proliferation of cloud storage service providers increases, however, so does demand for supporting conventional filesystem operations for legacy applications on top of the cloud object stores in order to provide stronger consistency guarantees to these legacy applications than the level of consistency offered by conventional cloud object stores.

DESCRIPTION OF EXAMPLE EMBODIMENTS

Overview

Presented herein are techniques for filesystem management for cloud object storage, and, in particular, filesystem durable write operations to cloud object storage. In an example embodiment, a method includes receiving, at an intermediate layer disposed between a filesystem layer and a distributed cloud object storage layer, at least one of a read operation or a write operation from the filesystem layer. The read operation identifies content stored in the distributed content object storage layer that is to be retrieved and the write operation identifies content that is to be stored to the distributed content object storage layer. The method also includes converting, by the intermediate layer, the read operation into a get operation and/or converting the write operation into a put operation. The method further includes storing, at the intermediate layer, an index that maps the read operation to the get operation and the write operation to the put operation. The index includes an association between the content identified by the filesystem layer to one or more objects in the distributed content object storage layer containing the identified content. The method includes sending, by the intermediate layer, to the distributed content object storage layer, at least one of the get operation or the put operation for the identified content.

EXAMPLE EMBODIMENTS

A variety of different services provide persistent distributed cloud object storage. Building a filesystem layer executing on top of these cloud object storage services can provide legacy applications with support for durable writes, as most applications are compatible with typical read and write operations that are common to standard operating system interfaces. The Institute of Electrical and Electronics Engineers (IEEE) has developed a set of standards for a Portable Operating System Interface (POSIX) that defines a standard operating system interface and environment, including a command interpreter (or "shell"), and common utility programs to support applications portability at the source code level. Cisco Technology's Hyperflex 3.0 (HX) provides an example of a POSIX interface solution in a distributed manner for a converged infrastructure system that integrates computing, networking and storage resources to increase efficiency and enable centralized management. For example, a filesystem layer, such as HX, may be implemented as described in one or more of U.S. Pat. Nos. 9,965,203; 9,220,619; 9,582,421; 9,521,198; 9,448,927, the contents of which applications are hereby incorporated by reference in their entirety.

Figure 1:
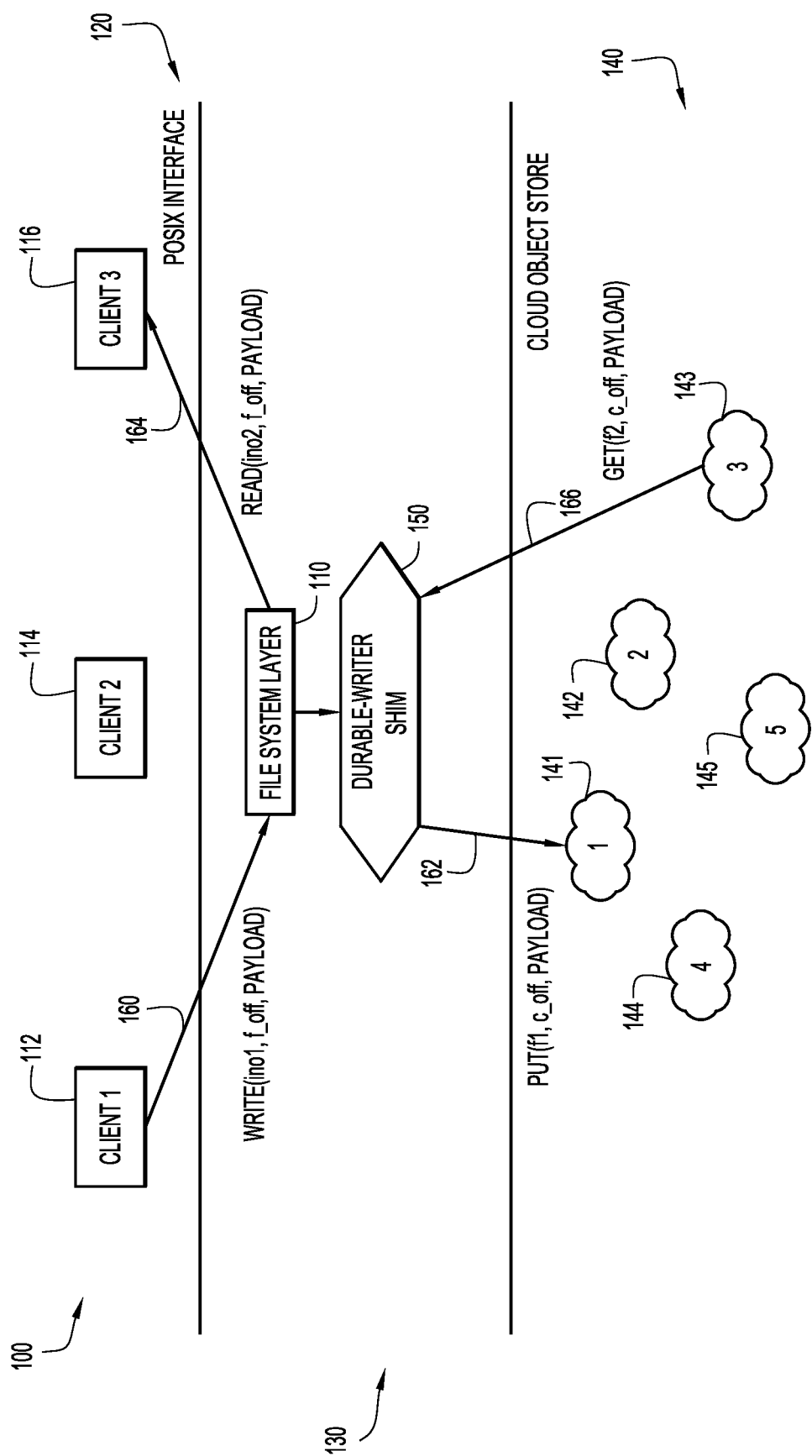
FIG. 1 is a logical diagram illustrating an intermediate layer translating read and write operations to put and get operations for a distributed cloud object storage layer, according to an example embodiment.

Referring now to FIG. 1, a diagram illustrating techniques for filesystem durable write operations to cloud object storage in a system 100 is shown according to an example embodiment. In this embodiment, system 100 includes a filesystem layer 110, an intermediate layer 130, and a distributed cloud object storage layer 140. Filesystem layer 110 may be a cluster that includes one or more users or clients executing applications or other services on filesystem layer 110. For example, in this embodiment, filesystem layer 110 includes a first client 112, a second client 114, and a third client 116. Each client 112, 114, 116 may be associated with a common enterprise or may be associated with different companies or users.

In this embodiment, filesystem layer 110 also includes a POSIX-compliant interface 120 to allow users or clients (e.g., first client 112, second client 114, third client 116, etc.) to execute commands to filesystem layer 110, including, for example, one or more read operations and/or write operations. Intermediate layer 130 is disposed between filesystem layer 110 and the persistent memory storage layer, in this case, distributed cloud object storage layer 140. As will be described in more detail below, intermediate layer 130 implements techniques for filesystem durable write operations to cloud object storage.

As shown in FIG. 1, system 100 includes one or more users or clients, for example, first client 112, second client 114, and/or third client 116, that may perform various read operations and/or write operations executed by filesystem layer 110 via POSIX-complaint interface 120. The expectation of clients 112, 114, 116 is that once some content is written down to the lower layer, for example, when content is saved to distributed cloud storage layer 140, that same content should be able to be read back by clients 112, 114, 116. However, many conventional cloud object stores (COS) provide weaker guarantees, such as providing eventual consistency for write (put) operations, and in some cases, conventional COS may provide different guarantees for different operations, such as eventual consistency for delete/overwrites of data and RAW for writes.

The example embodiments described herein, however, provide an intermediate layer 130 that provides a stronger consistency, such as Read after Write (RAW) or Read After Overwrite. According to the principles of the embodiments described herein, an intermediate layer is provided disposed between the filesystem layer and the distributed cloud storage layer (e.g., intermediate layer 130 disposed between filesystem layer 110 and distributed cloud storage layer 140), that includes a durable-writer shim or translator that provides durable write operations and/or read operations to the upper application layer (i.e., filesystem layer 110 and clients 112, 114, 116).

FIG. 1 illustrates a logical diagram of intermediate layer 130 translating read and write operations to put and get operations for distributed cloud object storage layer 140 in system 100 according to an example embodiment. According to the example embodiments described herein, an intermediate layer (e.g., intermediate layer 130) is provided that offers stronger RAW consistency for all these operations to provide full-fledged support for operations executed at filesystem layer 110. The table below lists the typical read consistency guaranteed for writes into a cloud object store (e.g., distributed cloud storage layer 140).

| Put Operation | Read Consistency |
| --- | --- |
| Write | Get(key) is RAW |
| Overwrite | Get(key) is Eventual |
| Delete | Get(key) is Eventual |
| Write with version | Get(key, version) is RAW, but Get(key) is Eventual |

Using the constraints provided by distributed cloud object storage layer 140, intermediate layer 130 includes a durable-writer shim 150 that provides durable and transparent write operations and/or read operations to filesystem layer 110 and/or one or more of clients 112, 114, 116. In this embodiment, FIG. 1 depicts a typical deployment scenario for system 100 that includes one or more clients 112, 114, 116 executing applications on filesystem layer 110 using POSIX-compliant interface 120. These applications may be any of a variety of applications or software, such as warehousing, databases, or any other programs that require strong write and read consistency.

The filesystem layer 110 transforms requested operations from applications executed by clients 112, 114, 116, for example, read operations and/or write operations into operations at filesystem layer 110. In addition to read/write operations from clients 112, 114, 116, filesystem layer 110 may also perform filesystem management operations, such as reclaiming unreferenced space and/or reducing space usage by de-duplicating common objects or common parts of an object. According to the principles of the embodiments described herein, those read operations, write operations, and/or other filesystem management operations are translated by durable-writer shim 150 of intermediate layer 130 into get operations, put operations, overwrite operations, and/or delete operations that are understood by the distributed cloud object storage layer 140. That is, durable-writer shim 150 of intermediate layer 130 acts as a translator to convert operations executed at filesystem layer 110 to operations to be performed at distributed cloud object storage layer 140.

For example, in the embodiment shown in FIG. 1, distributed cloud object storage layer 140 includes a plurality of objects, including a first cloud object 141, a second cloud object 142, a third cloud object 143, a fourth cloud object 144, and a fifth cloud object 145. First client 112 may initiate a write operation 160 (e.g., write(ino1, f_off, payload)) that is directed to content associated with first cloud object 141. Write operation 160 is received by durable-writer shim 150 of intermediate layer 130, which translates or converts write operation 160 into a put operation 162 (e.g., put(f1, c_off, payload)). Put operation 162 is sent to distributed cloud object storage layer 140, where the requested content or modification is stored to first cloud object 141.

Similarly, when a read operation is requested from filesystem layer 110, durable-writer shim 150 of intermediate layer 130 translates or converts the requested read operation into a get operation to be performed on an object stored at distributed cloud object storage layer 140. For example, third client 116 may initiate a read operation 164 (e.g., read(ino2, f_off, payload)) that is directed to content associated with third cloud object 143. Read operation 164 is received by durable-writer shim 150 of intermediate layer 130, which then translates or converts read operation 164 into a get operation 166 (e.g., get(f2, c_off, payload)). Get operation 166 is sent to distributed cloud object storage layer 140, where the requested content is retrieved from third cloud object 143, and provided back to third client 116.

Figure 2:
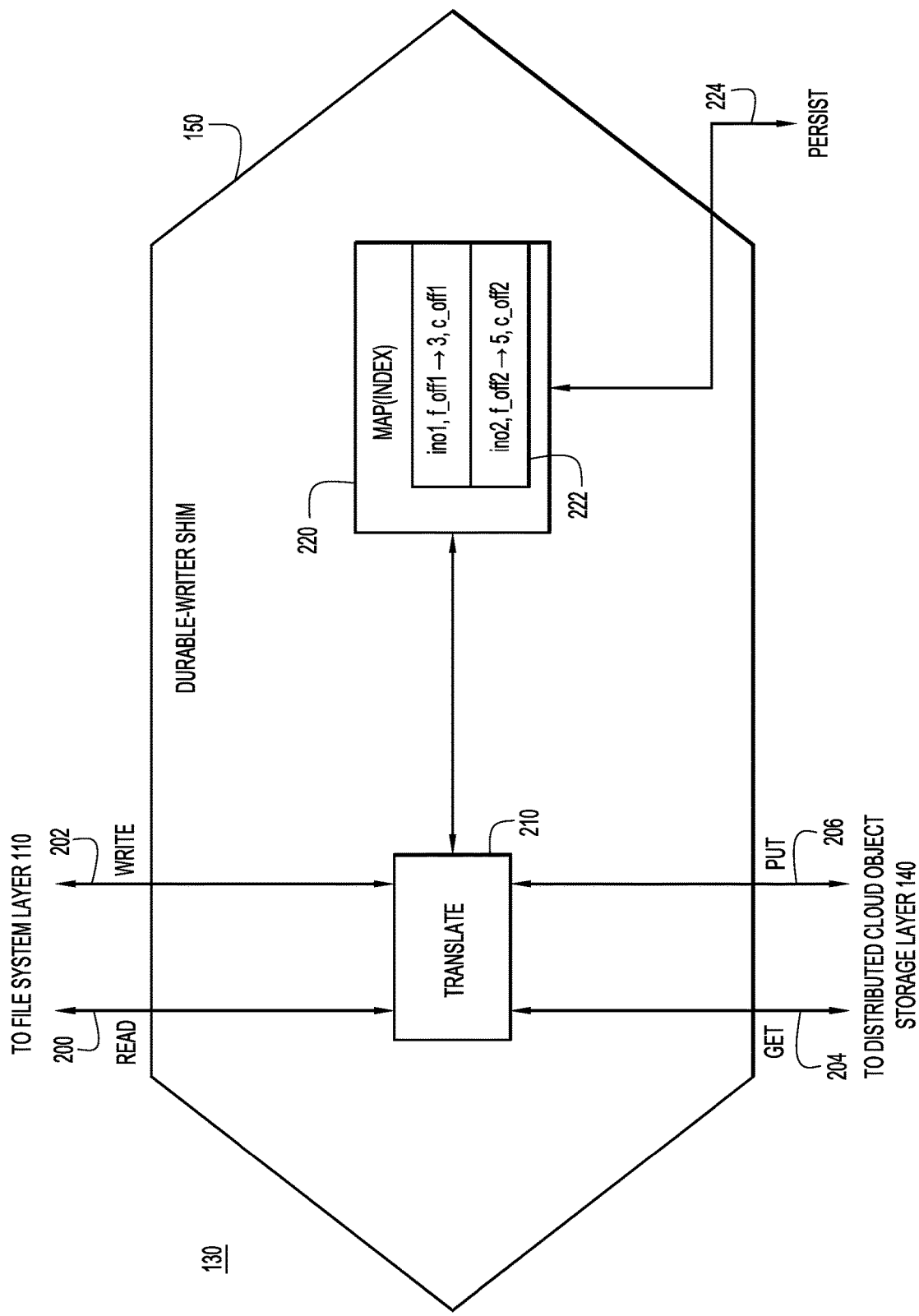
FIG. 2 is a block diagram of an intermediate layer generating an index for mapping content from a filesystem layer to a distributed cloud object storage layer, according to an example embodiment.

FIG. 2 is a block diagram of durable-writer shim 150 of intermediate layer 130 generating an index 220 for mapping content from filesystem layer 110 to distributed cloud object storage layer 140, according to an example embodiment. On a high level, durable-writer shim 150 shim acts like a translator that converts read operations 200 and/or write operations 202 from filesystem layer 110 into get operations 204 and/or put operations 206 for distributed cloud object storage layer 140. In an example embodiment, durable-writer shim 150 of intermediate layer 130 supports a variety of possible operations, including read operations, write operations, overwrite operations, and/or remap operations.

In this embodiment, durable-writer shim 150 of intermediate layer 130 has two main components, a translator module 210 and an index or map 220. Translator module 210 converts or translates file and management I/O operations from filesystem layer 110 (e.g., read operations 200 and/or write operations 202) into operations for distributed cloud object storage layer 140 (e.g., get operations 204 and/or put operations 206). In an example embodiment, translator module 210 of durable-writer shim 150 converts operations by appending a version identifier to any new writes. For example, a version identifier may be a unique generation-id for the content.

Additionally, index 220 of durable-writer shim 150 stores a mapping of the translation state between the layers (i.e., mapping the association between filesystem layer 110 and distributed cloud object storage layer 140). For example, index 220 stores relationships or associations 222 between content or data from filesystem layer 110 (e.g., in the format (file, file_offset, length)) to objects in distributed cloud object storage layer 140 (e.g., in the format (object, cloud_offset, length)). In other embodiments, associations 222 may be simplified (e.g., in the format (file, file_offset, length→object)).

In addition to associations 222, index 220 may also store operational intent. The translation of reads/writes into index 220 may also be backed by strongly consistent persist store operation 224. In other embodiments, intermediate layer 130 may instead wait until the operations represented by associations 222 in index 220 are persisted. A variety of operations may be stored in index 220, as described below.

A Durable-Write operation for distributed cloud object storage layer 140 is supported by RAW semantics. For each write operation 202 from filesystem layer 110, durable-writer shim 150 appends the corresponding key with a generation identifier (gen-id) of the object starting with value 0. For example, a write operation with a key having a universally unique identifier (uuid) becomes a put operation with a key having the same identifier and further including a generation identifier (e.g., (uuid,0)). Durable-writer shim 150 first writes this information into distributed cloud object storage layer 140, and, upon a successful write, is inserted then as an entry into index 220. Durable-writer shim 150 may also notify or inform filesystem layer 110 that the operation was successful. When a read lookup comes (i.e., read operation 200) from filesystem layer 110, durable-writer shim 150 accesses or consults index 220 to determine the generation identifier (gen-id) associated with the requested key before sending the get request (i.e., get operation 204) to distributed cloud object storage layer 140.

A Durable-Overwrite operation is an extension of the Durable-Write operation, described above, where the durable-writer shim 150 increments the generation identifier (gen-id) by one (e.g., (uuid, cur_gen_id+1)). Since this new write operation will be unique, it automatically follows the RAW semantics. After a successful write, durable-writer shim 150 updates index 220 and notifies or informs filesystem layer 110 that the operation was successful. With this transformation, read operations to the overwritten object will not fail. Additionally, in the background, the older object (uuid, cur_gen_id) can be deleted. These deletions and tracking of deletion of such objects can be made part of filesystem layer 110 so that they are not orphaned due to a crash. If implementing a durable delete operation at durable-writer shim 150 of intermediate layer 130, the durable delete operation can be accomplished by verifying, (gen_id−1) if and only if greater than 0 is deleted before calling for deletion of (gen_id).

A Durable-Delete operation may be implemented by durable-writer shim 150 by changing the generation identifier of an object, for example, by setting the gen-id to −1 in index 220. Any read operations will automatically be redirected to a "No such file or directory" message (i.e., ENOENT). The object (uuid, cur_gen_id) can be processed for deletion as discussed before. A batch process can query all objects with gen−id mapped to −1 returns ENOENT before removing the entry from index 220.

A Durable-Remap operation of objects in distributed cloud object storage layer 140 may be used for general filesystem management operations. For example, a remapping operation may be performed on objects for a variety of purposes, including: (a) to reclaim space (e.g., in cases where the client/filesystem layer 110 no longer references the data), (b) to dehydrate the distributed cloud object storage layer usage by de-duplicating data, and/or (c) to improve backup and restore by reorganizing data to improve sequentiality of the data layout. Such operations are performed by durable-writer shim 150 while translator module 210 continues to get read operations 200 and/or write operations 202 from clients (e.g., clients 112, 114, 116) via filesystem layer 110. The process of performing a remapping operation by durable-writer shim 150 is described in more detail in reference to FIGS. 3-5 below.

Figure 3:
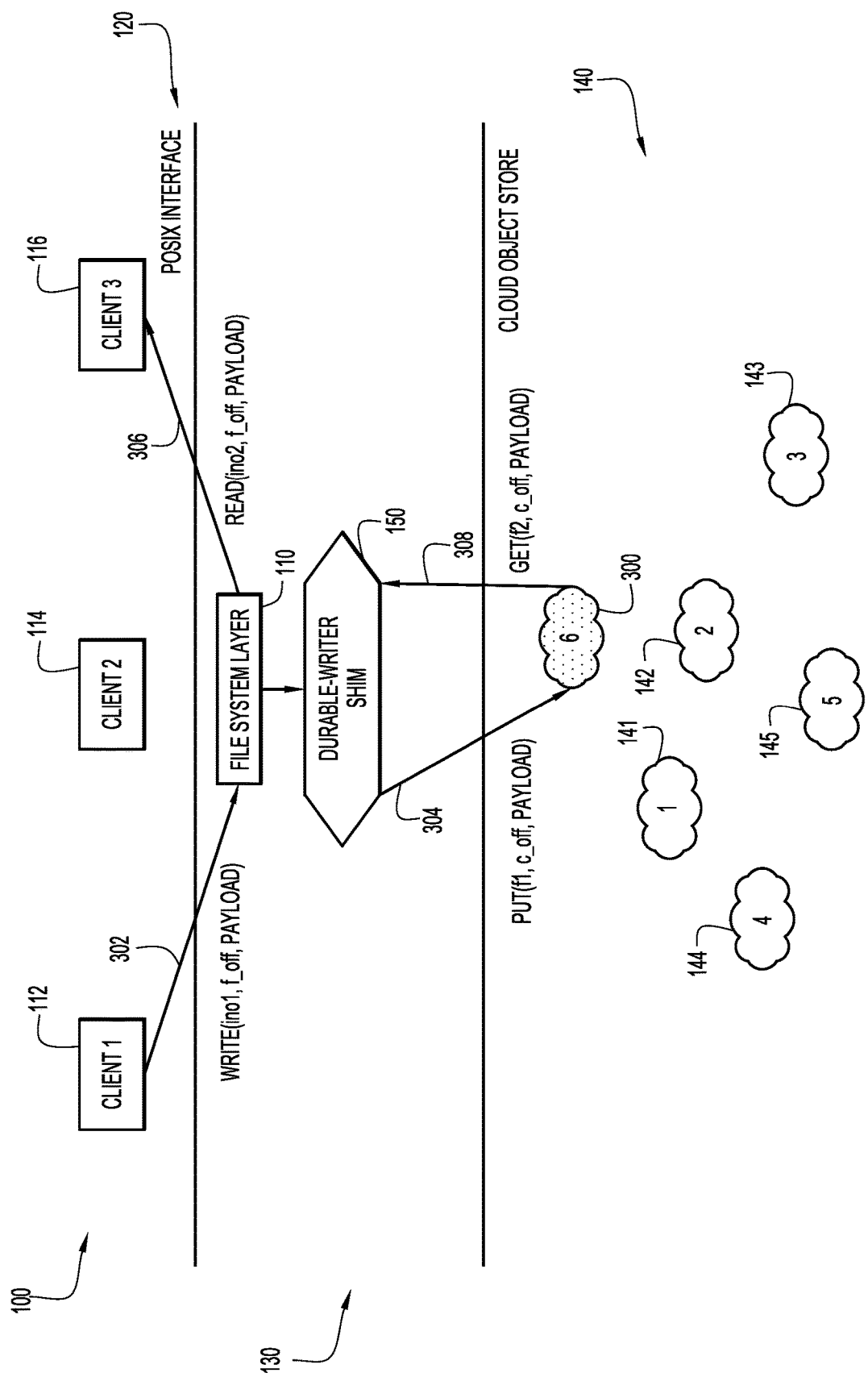
FIG. 3 is a diagram illustrating remapping of content in a distributed cloud object storage layer, according to an example embodiment.

Referring now to FIG. 3, a diagram illustrating remapping of content in distributed cloud object storage layer 140 is shown according to an example embodiment. In one embodiment, one or more of plurality of objects 141, 142, 143, 144, 145 may be acted upon in order to reclaim unused space and/or to compact data. For example, in this embodiment, content or data accessible from third cloud object 143 and fifth cloud object 145 in distributed cloud object storage layer 140 may be compacted and rewritten into a new cloud object 300. In addition, upon rewriting of the content/data to new cloud object 300, third cloud object 143 and fifth cloud object 145 may be deleted so that unused space can be reclaimed.

A basic approach of simply reading data from third cloud object 143 and fifth cloud object 145 using a get operation and then writing the data using a put operation could cause first client 112 to potentially experience a "No such file or directory" message (i.e., ENOENT), which would cause a failure of first client 112's application. According to the example embodiments, the techniques described herein allow read/write operations from filesystem layer 110 while the data in distributed cloud object storage layer 140 is reorganized without affecting filesystem layer 110 and/or POSIX-compliant interface 120 semantics. Additionally, by the definition of a durable-write operation, as described above, the techniques described herein will be able to handle a crash of intermediate layer 130 and/or durable-writer shim 150 (i.e., is crash consistent).

Figure 4:
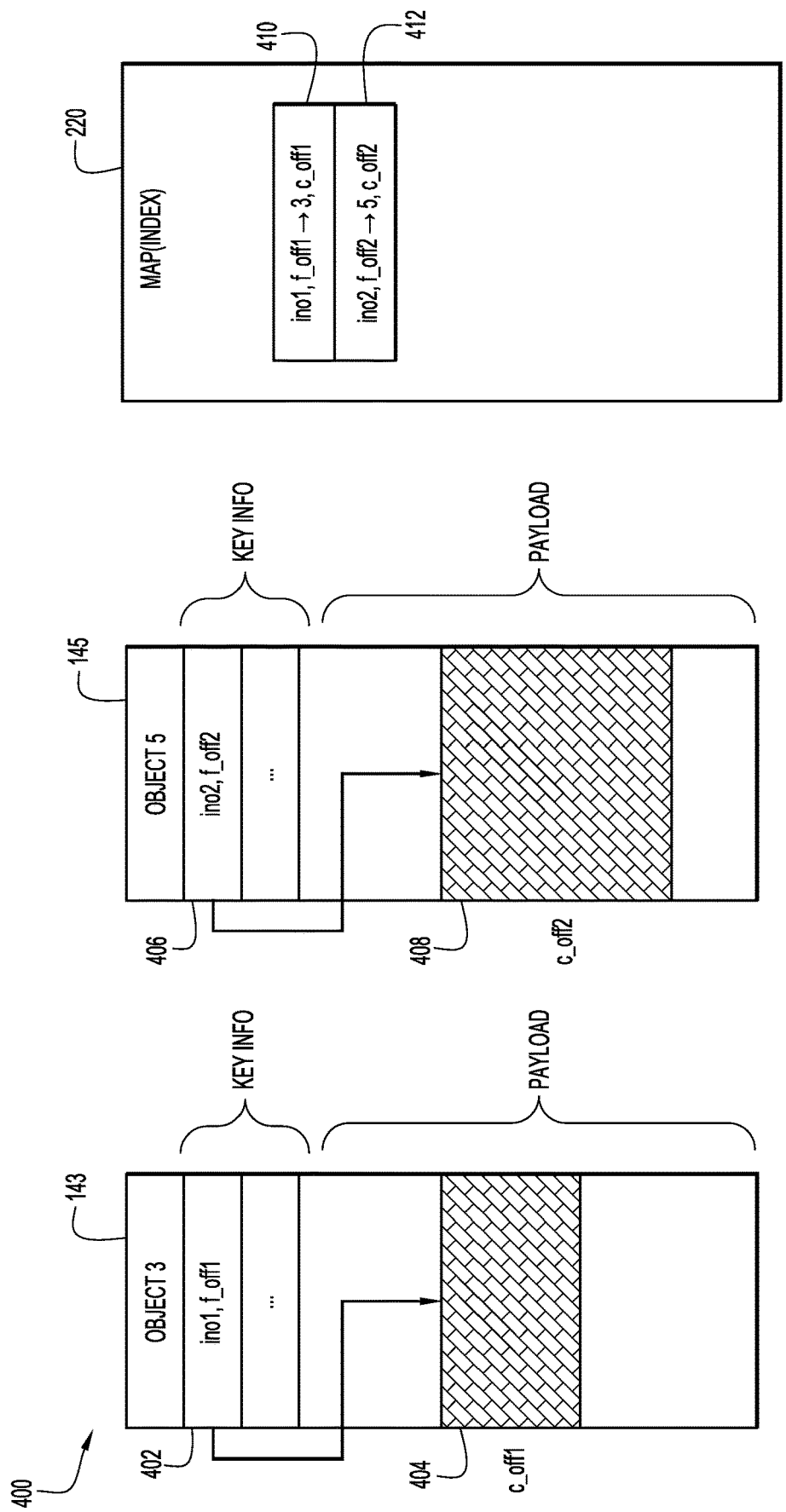
FIG. 4 is a diagram of remapping of content from multiple objects in a distributed cloud object storage layer, according to an example embodiment.

FIG. 4 is a diagram of a remapping operation 400 for remapping content from multiple objects in distributed cloud object storage layer 140 according to an example embodiment. In this embodiment, content from third cloud object 143 and fifth cloud object 145 is remapped to new cloud object 300. In an example embodiment, remapping operation 400 may be implemented by durable-writer shim 150 of intermediate layer 130. As shown in FIG. 4, remapping operation 400 may begin with durable-writer shim 150 of intermediate layer 130 reading the content of the cloud objects that are to be remapped, for example, third cloud object 143 and fifth cloud object 145.

In this embodiment, third cloud object 143 includes a first key 402 identifying content from filesystem layer 110 (e.g., (ino1, f_off1)) and an associated value 404 (e.g., (c_off1)) for the location of the data stored in third cloud object 143. Fifth cloud object 145 includes a second key 406 identifying content from filesystem layer 110 (e.g., (ino2, f_off2)) and an associated value 408 (e.g., (c_off2)) for the location of the data stored in fifth cloud object 145. As shown in FIG. 4, index 220 of durable-writer shim 150 of intermediate layer 130 includes the corresponding associations mapping the content between filesystem layer 110 and distributed cloud object storage layer 140, including a first association 410 (e.g., ino1, f_off1→3, c_off1) for the content associated with third cloud object 143, and a second association 412 (e.g., ino2, f_off2→5, c_off2) for the content associated with fifth cloud object 145.

Figure 5:
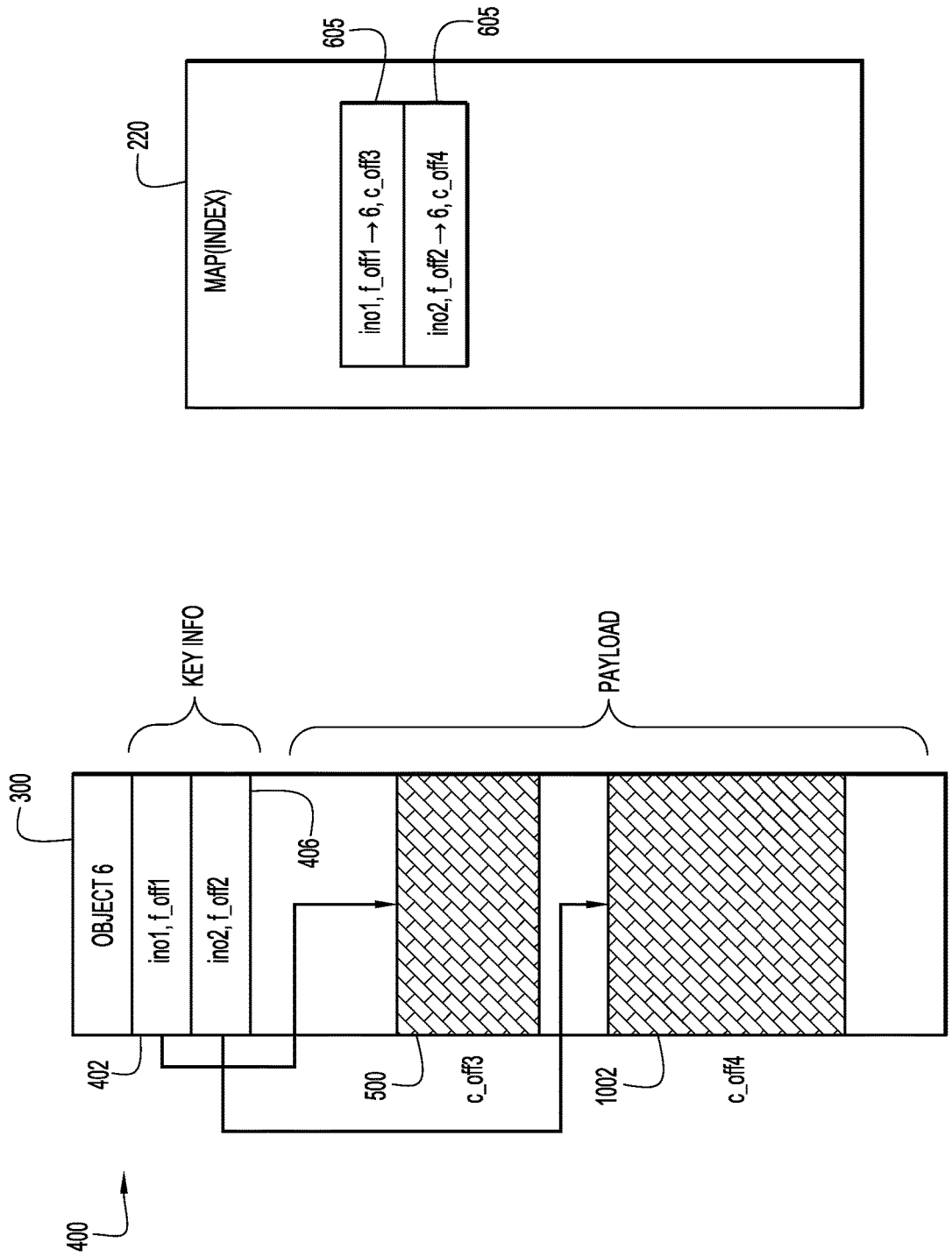
FIG. 5 is a diagram illustrating generating a new object in a distributed cloud object storage layer, according to an example embodiment.

Referring now to FIG. 5, a diagram illustrating generating new cloud object 300 as part of remapping operation 400 in distributed cloud object storage layer 140 is shown according to an example embodiment. In this embodiment, remapping operation 400 continues with durable-writer shim 150 of intermediate layer 130 merging the content associated with both third cloud object 143 and fifth cloud object 145 to new cloud object 300 (i.e., a sixth cloud object). As shown in FIG. 5, new object 300 includes first key 402 identifying content from filesystem layer 110 (e.g., (ino1, f_off1)) and second key 406 identifying content from filesystem layer 110 (e.g., (ino2, f_off2)). In new object 300, first key 402 now has an associated value 500 (e.g., (c_off3)) for the location of the data stored in new cloud object 300, and second key 406 now has an associated value 502 (e.g., (c_off4)) for the location of the data stored in new cloud object 300.

Upon merging the content into new cloud object 300, durable-writer shim 150 of intermediate layer 130 generates new mappings or associations between content between filesystem layer 110 and distributed cloud object storage layer 140. For example, as shown in FIG. 5, a third association 504 (e.g., ino1, f_off1→6, c_off3) maps the content previously associated with third cloud object 143 to new cloud object 300 (i.e., sixth cloud object), and a fourth association 506 (e.g., ino2, f_off2→6, c_off4) maps the content previously associated with fifth cloud object 145 to new cloud object 300 (i.e., sixth cloud object).

Next, durable-writer shim 150 of intermediate layer 130 generates a put operation for new cloud object 300 to store new cloud object 300 in distributed cloud object storage layer 140. If distributed cloud object storage layer 140 is RAW consistent, then durable-writer shim 150 of intermediate layer 130 updates index 220 with the new associations (i.e., third association 504 and fourth association 506). If distributed cloud object storage layer 140 is eventual consistent, then durable-writer shim 150 of intermediate layer 130 reads the attributes of new cloud object 300 until it is consistent, and then proceeds to update index 220 with the new associations (i.e., third association 504 and fourth association 506).

Additionally, durable-writer shim 150 of intermediate layer 130 may wait for the updates to index 220 (e.g., new associations 504, 506) to persist, which may occur eventual or immediate, for example, by a persist operation, such as persist operation 224 shown in FIG. 2. Once the updates to index 220 persist so that remapping operation 400 is complete and the remapped content is now located in new cloud object 300, durable-writer shim 150 of intermediate layer 130 may delete third cloud object 143 and fifth cloud object 145.

During normal operation of system 100, any requested read operations directed to the remapped content (e.g., ino1, f_off1 and/or ino2, f_off2) may always be returned to filesystem layer 110. A crash can happen at any stage during remapping operation 400. A crash that occurs after the put operation stores new cloud object 300 in distributed cloud object storage layer 140 does not affect system 100, but new cloud object 300 could be a leak. There are ways to handle the leak, for example, by always writing the identifier of the new cloud object that will be written and pick the highest next-id. For example, if third cloud object 143 has next-id=4, and fifth cloud object 145 has next-id=6, the next-id for merging third cloud object 143 and fifth cloud object 145 will be the highest (i.e., max(4,6)=6). As a result, when remapping operation 400 reruns after a crash, the same object id for new cloud object 300 is re-written (i.e., 6). In addition, by waiting for the updates to index 220 (e.g., new associations 504, 506) to persist guarantees that index 220 is never stale and the remapped objects are deleted (i.e., third cloud object 143 and fifth cloud object 145) only after the update to index 220 becomes durable.

Figure 6:
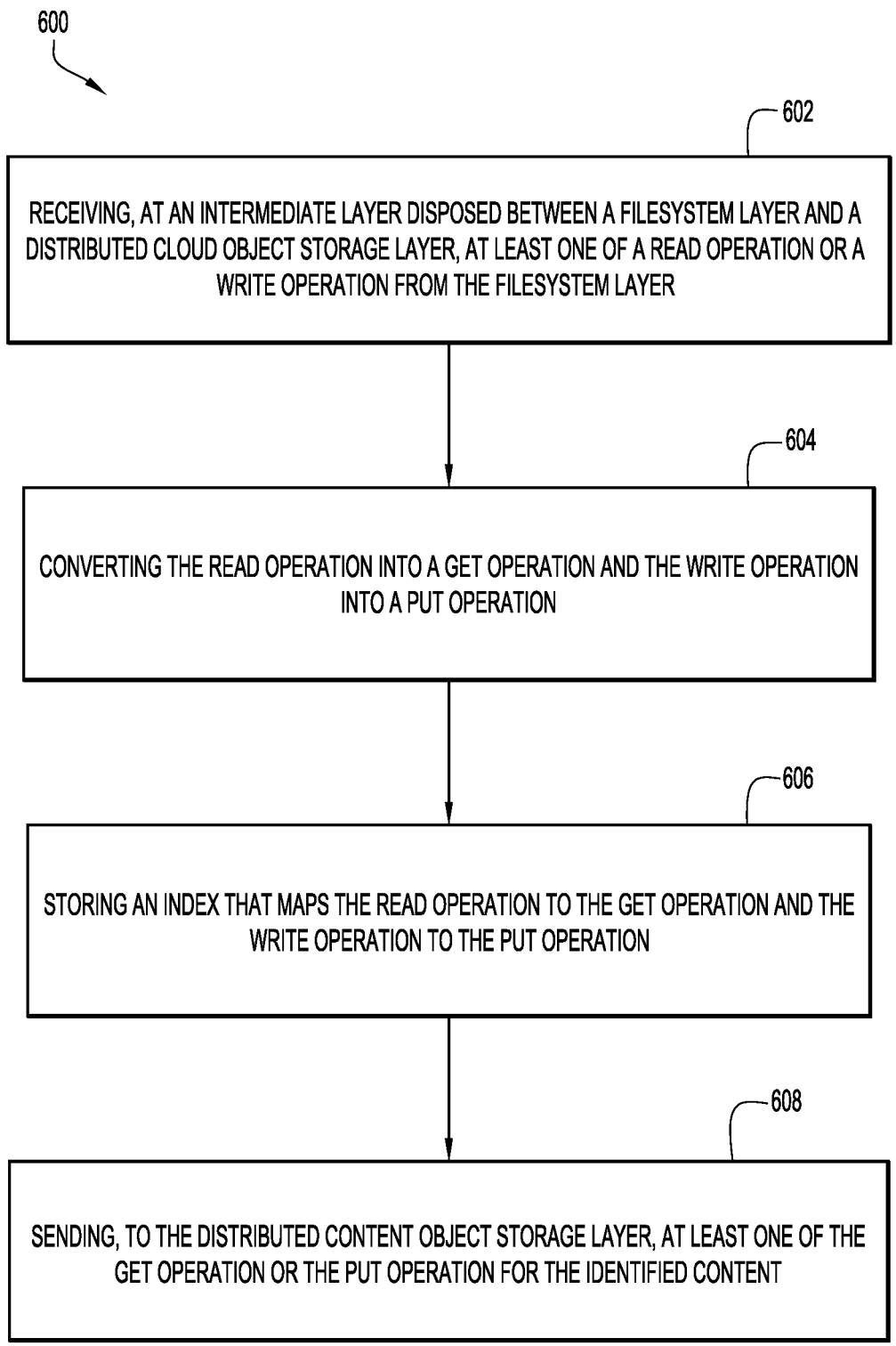
FIG. 6 is a flowchart of a method of read/write operation translation for a distributed cloud object storage system, according to an example embodiment.

FIG. 6 is a flowchart of a method 600 of read/write operation translation for a distributed cloud object storage system according to an example embodiment. In one embodiment, method 600 may be implemented by durable-writer shim 150 of intermediate layer 130. In this embodiment, method 600 may begin at an operation 602. At operation 602, intermediate layer 130 receives at least one of a read operation or a write operation from filesystem layer 110. Next, at an operation 604, intermediate layer 130 converts the read operation or write operation received at operation 602 into a get operation (in the case of a read operation) or a put operation (in the case of a write operation). For example, durable-writer shim 150 of intermediate layer 130 may include translator module 210 that coverts or translates the corresponding operations from filesystem layer 110 to operations for distributed cloud object storage layer 140.

Next, at an operation 606, an index is stored that maps the read operation or write operation to the corresponding get operation or put operation. For example, as described above, durable-writer shim 150 of intermediate layer 130 may include index 220 that contains associations 222 mapping between filesystem layer 110 and distributed cloud object storage layer 140.

At an operation 608, the get operation or put operation is sent to distributed cloud object storage layer 140 for the content identified by the original read operation or write operation received at the intermediate layer 130 from filesystem layer 110. Additionally, after operation 608, the request may be fulfilled to filesystem layer 110 by providing the requested content from distributed cloud object storage layer 140 or providing a confirmation that the content was stored.

Figure 7:
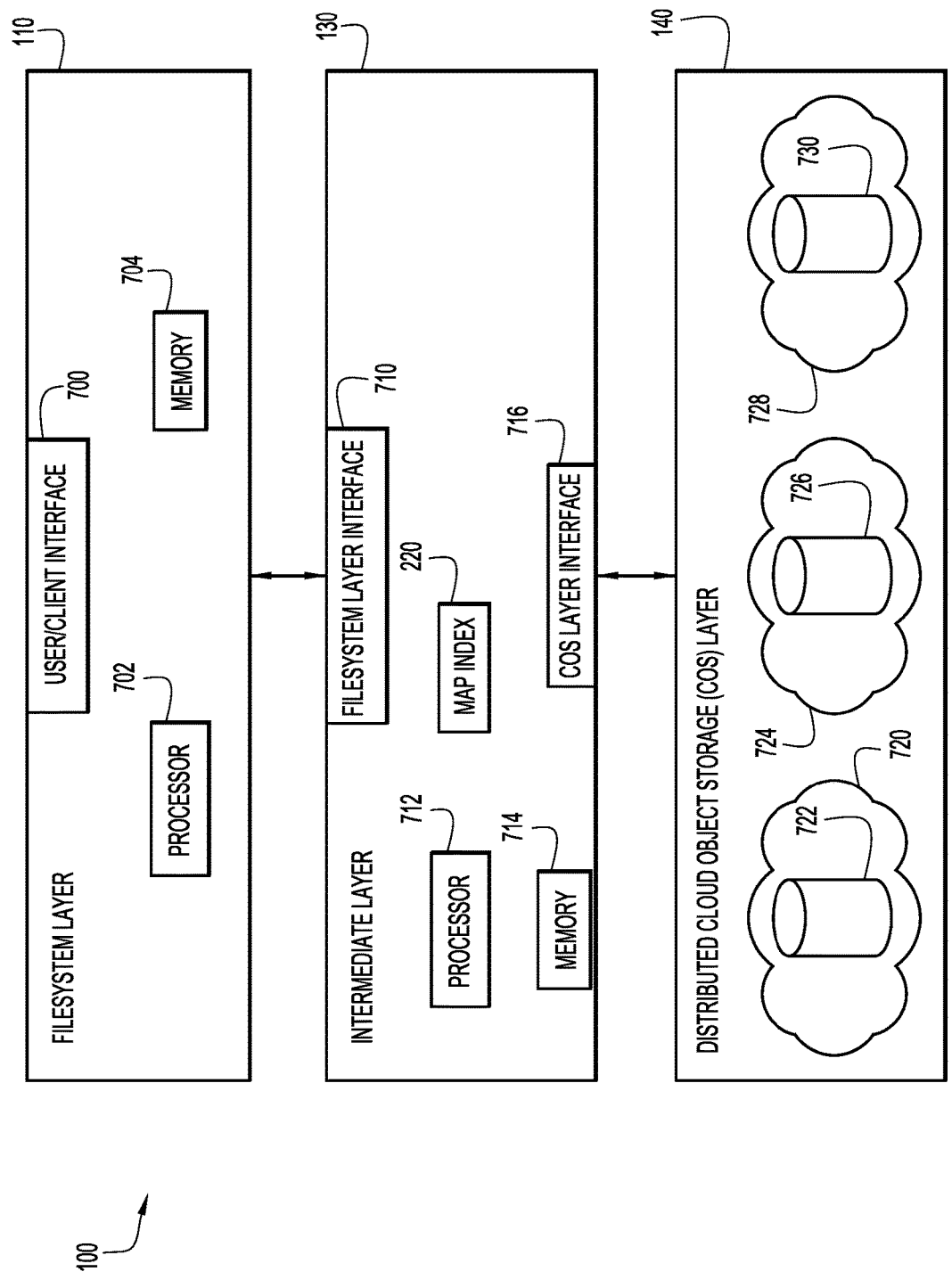
FIG. 7 is a logical diagram of a system in which filesystem durable write operations to cloud object storage may implemented, according to an example embodiment.

FIG. 7 is a logical diagram of system 100 in which filesystem durable write operations to cloud object storage may implemented, according to an example embodiment. As described above, system 100 includes filesystem layer 110, intermediate layer 130, and distributed cloud object storage layer 140. In an example embodiment, filesystem layer 110 may include a user/client interface 700 that is configured to allow filesystem layer 110 to communicate with one or more users and/or clients, for example, one or more of clients 112, 114, 116. In one embodiment, user/client interface 700 may be POSIX-compliant, for example, POSIX-compliant interface 120. Filesystem layer 110 may include a processor 702 for processing information and may further include a bus (not shown) or other communication mechanism coupled with processor 702 for communicating the information. While the figure shows a single block 702 for a processor, it should be understood that the processor 702 may represent a plurality of processing cores, each of which can perform separate processing.

Filesystem layer 110 may also include a memory 704. The memory 704 may be read only memory (ROM), random access memory (RAM), magnetic disk storage media devices, optical storage media devices, flash memory devices, electrical, optical, or other physical/tangible memory storage devices. Thus, in general, the memory 704 may comprise one or more tangible (non-transitory) computer readable storage media (e.g., a memory device) encoded with software comprising computer executable instructions and when the software is executed (by the processor 702) it is operable to perform the operations described herein. For example, one or more instructions may be stored in memory 704 for providing one or more of the functions of filesystem layer 110 described herein.

In an example embodiment, intermediate layer 130 may include a filesystem interface 710 that is configured to allow intermediate layer 130 to communicate with filesystem layer 110. In some embodiments, intermediate layer 130 may be executed in software, hardware, or a combination of both.

For example, in one embodiment, intermediate layer 130 may be a virtual machine executing on a server or computer that is hosting filesystem layer 110. Intermediate layer 130 may include a processor 712 for processing information and may further include a bus (not shown) or other communication mechanism coupled with processor 712 for communicating the information. While the figure shows a single block 712 for a processor, it should be understood that the processor 712 may represent a plurality of processing cores, each of which can perform separate processing.

Intermediate layer 130 may also include a memory 714. The memory 714 may be read only memory (ROM), random access memory (RAM), magnetic disk storage media devices, optical storage media devices, flash memory devices, electrical, optical, or other physical/tangible memory storage devices. Thus, in general, the memory 714 may comprise one or more tangible (non-transitory) computer readable storage media (e.g., a memory device) encoded with software comprising computer executable instructions and when the software is executed (by the processor 712) it is operable to perform the operations described herein. For example, instructions for one or more of operations of durable-writer shim 150 (including translator module 210 and index 220) may be stored in memory 714 for providing one or more of the functions of intermediate layer 130 described herein. In particular, durable-writer shim 150 (including translator module 210 and index 220) may cause intermediate layer 130 to perform the operations described above in connection with FIGS. 1-6 when executed by processor 712 from memory 714.

Intermediate layer 130 may also include a COS layer interface 716. COS layer interface 716 is configured to allow intermediate layer 130 to communicate with distributed cloud object storage layer 140. Distributed cloud object storage layer 140 may include a plurality of cloud object stores (COS). For example, distributed cloud object storage layer 140 may include a first COS 720, a second COS 724, and/or a third COS 728. Each COS 720, 724, 728 may be associated with a different cloud storage service provider or may be associated with different data centers or other locations associated with one or more cloud storage service providers. In addition, each COS 720, 724, 728 includes one or more storage devices that are configured to store the cloud objects described above. For example, COS 720 may include a first storage device 722, second COS 724 may include a second storage device 726, and third COS may include a third storage device 730. Moreover, each storage device 722, 726, 730 may be a plurality of distributed storage devices.

Additionally, in some embodiments, one or more components of system 100 may be distributed in nature. For example, each of filesystem layer 110, intermediate layer 130 (including durable-writer shim 150), and distributed cloud object storage layer 140 may be implemented or hosted by different entities, systems, or vendors and connected with each other over a communication network. In this way, one or more of filesystem layer 110, intermediate layer 130, and distributed cloud object storage layer 140 may be provided separately from each other so that system 100 may be distributed across a network.

According to the principles of the embodiments described herein, durable writes may be provided, where a distributed cloud object storage layer guarantees that completed transactions persist in the event of crashes or server failure. Additionally, the example embodiments provide transparent remapping of data on the distributed cloud object storage layer, where data written by legacy applications on a filesystem layer can be moved around for space-management, reliability or availability reasons The example embodiments provide a mechanism to have durable and transparent writes/reads with performance to client I/O while managing filesystem operations, such as translating the writes onto COS, running management operations like garbage collection, deduplication, and performance optimization for sequential reads.

In summary, a method is provided comprising: receiving, at an intermediate layer disposed between a filesystem layer and a distributed cloud object storage layer, at least one of a read operation or a write operation from the filesystem layer, wherein the read operation identifies content stored in the distributed content object storage layer that is to be retrieved, and wherein the write operation identifies content that is to be stored to the distributed content object storage layer; converting, by the intermediate layer, the read operation into a get operation and/or the write operation into a put operation; storing, at the intermediate layer, an index that maps the read operation to the get operation and the write operation to the put operation, wherein the index includes an association between the content identified by the filesystem layer to one or more objects in the distributed content object storage layer containing the identified content; and sending, by the intermediate layer, to the distributed content object storage layer, at least one of the get operation or the put operation for the identified content.

In another form, a non-transitory computer readable storage media encoded with instructions that, when executed by a processor of an intermediate layer disposed between a filesystem layer and a distributed cloud object storage layer, cause the processor to: receive at least one of a read operation or a write operation from the filesystem layer, wherein the read operation identifies content stored in the distributed content object storage layer that is to be retrieved, and wherein the write operation identifies content that is to be stored to the distributed content object storage layer; convert the read operation into a get operation and/or convert the write operation into a put operation; store an index that maps the read operation to the get operation and the write operation to the put operation, wherein the index includes an association between the content identified by the filesystem layer to one or more objects in the distributed content object storage layer containing the identified content; and send to the distributed content object storage layer, at least one of the get operation or the put operation for the identified content.

In another embodiment, a system is provided comprising: an intermediate layer disposed between a filesystem layer and a distributed cloud object storage layer; wherein the intermediate layer includes at least a memory and a processor in communication with the memory; and wherein the processor is configured to: receive at least one of a read operation or a write operation from the filesystem layer, wherein the read operation identifies content stored in the distributed content object storage layer that is to be retrieved, and wherein the write operation identifies content that is to be stored to the distributed content object storage layer; convert the read operation into a get operation and/or convert the write operation into a put operation; store an index in the memory, wherein the index maps the read operation to the get operation and/or the write operation to the put operation, and wherein the index includes an association between the content identified by the filesystem layer to one or more objects in the distributed content object storage layer containing the identified content; and send to the distributed content object storage layer, at least one of the get operation or the put operation for the identified content.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving, at an intermediate layer disposed between a filesystem layer and a distributed cloud object storage layer, at least one of a read operation or a write operation from the filesystem layer, wherein the read operation identifies content stored in the distributed cloud object storage layer that is to be retrieved, and wherein the write operation identifies content that is to be stored to the distributed cloud object storage layer;
   converting, by a durable writer shim in the intermediate layer, the read operation into a get operation or the write operation into a put operation;
   storing, at the intermediate layer, an index that maps the read operation to the get operation and the write operation to the put operation, wherein the index includes an association between the content identified by the filesystem layer to one or more objects in the distributed cloud object storage layer containing the identified content; and
   sending, by the intermediate layer, to the distributed cloud object storage layer, at least one of the get operation or the put operation for the identified content.

2. The method of claim 1, wherein the at least one of the read operation or the write operation from the filesystem layer identifies the content using a file identifier, a file offset value, and a length.

3. The method of claim 2, wherein the at least one of the get operation or the put operation identifies the content using at least an object identifier.

4. The method of claim 1, further comprising:
   upon receiving a new read operation or a new write operation, storing a new entry in the index to map the new read operation to a new get operation or the new write operation to a new put operation; and
   upon storing the new entry in the index, persisting the index.

5. The method of claim 1, further comprising:
   performing a remapping operation to move content stored in two or more objects in the distributed cloud object storage layer to a new object; and
   updating the index stored at the intermediate layer with an association between the moved content and the new object.

6. The method of claim 5, wherein the remapping operation comprises:
   combining first content stored in a first object and second content stored in a second object into the new object;
   generating a new entry for the index that includes an association between the first content and the second content and the new object; and
   performing a put operation to store the new object in the distributed cloud object storage layer.

7. The method of claim 1, further comprising:
   including a version identifier with the put operation; and
   wherein a subsequent get operation directed to the identified content that is associated with the version identifier is read after write consistent.

8. One or more non-transitory computer readable storage media encoded with instructions that, when executed by a processor of an intermediate layer disposed between a filesystem layer and a distributed cloud object storage layer, cause the processor to:
   receive at least one of a read operation or a write operation from the filesystem layer, wherein the read operation identifies content stored in the distributed cloud object storage layer that is to be retrieved, and wherein the write operation identifies content that is to be stored to the distributed cloud object storage layer;
   convert, using a durable writer shim in the intermediate layer, the read operation into a get operation or convert the write operation into a put operation;
   store an index that maps the read operation to the get operation and the write operation to the put operation, wherein the index includes an association between the content identified by the filesystem layer to one or more objects in the distributed cloud object storage layer containing the identified content; and
   send to the distributed cloud object storage layer, at least one of the get operation or the put operation for the identified content.

9. The one or more non-transitory computer readable storage media of claim 8, wherein the at least one of the read operation or the write operation from the filesystem layer identifies the content using a file identifier, a file offset value, and a length.

10. The one or more non-transitory computer readable storage media of claim 9, wherein the at least one of the get operation or the put operation identifies the content using at least an object identifier.

11. The one or more non-transitory computer readable storage media of claim 8, further comprising instructions to cause the processor to:
    upon receiving a new read operation or a new write operation, store a new entry in the index to map the new read operation to a new get operation or the new write operation to a new put operation; and
    upon storing the new entry in the index, persist the index.

12. The one or more non-transitory computer readable storage media of claim 8, further comprising instructions to cause the processor to:
    perform a remapping operation to move content stored in two or more objects in the distributed cloud object storage layer to a new object; and
    update the index stored at the intermediate layer with an association between the moved content and the new object.

13. The one or more non-transitory computer readable storage media of claim 12, wherein the remapping operation comprises instructions to cause the processor to:
    combine first content stored in a first object and second content stored in a second object into the new object;
    generate a new entry for the index that includes an association between the first content and the second content and the new object; and
    perform a put operation to store the new object in the distributed cloud object storage layer.

14. The one or more non-transitory computer readable storage media of claim 8, further comprising instructions to cause the processor to:
    include a version identifier with the put operation; and
    wherein a subsequent get operation directed to the identified content that is associated with the version identifier is read after write consistent.

15. A system comprising:
    an intermediate layer disposed between a filesystem layer and a distributed cloud object storage layer;

wherein the intermediate layer includes at least a memory and a processor in communication with the memory; and wherein the processor is configured to:

receive at least one of a read operation or a write operation from the filesystem layer, wherein the read operation identifies content stored in the distributed cloud object storage layer that is to be retrieved, and wherein the write operation identifies content that is to be stored to the distributed cloud object storage layer;

convert, using a durable shim layer in the intermediate layer, the read operation into a get operation or convert the write operation into a put operation;

store an index in the memory, wherein the index maps the read operation to the get operation or the write operation to the put operation, and wherein the index includes an association between the content identified by the filesystem layer to one or more objects in the distributed cloud object storage layer containing the identified content; and send to the distributed cloud object storage layer, at least one of the get operation or the put operation for the identified content.

16. The system of claim 15, wherein the at least one of the read operation or the write operation from the filesystem layer identifies the content using a file identifier, a file offset value, and a length.

17. The system of claim 16, wherein the at least one of the get operation or the put operation identifies the content using at least an object identifier.

18. The system of claim 15, wherein the processor is further configured to:

upon receiving a new read operation or a new write operation, store a new entry in the index to map the new read operation to a new get operation or the new write operation to a new put operation; and upon storing the new entry in the index, persist the index.

19. The system of claim 15, wherein the processor is further configured to:

perform a remapping operation to move content stored in two or more objects in the distributed cloud object storage layer to a new object; and update the index stored in the memory with an association between the moved content and the new object.

20. The system of claim 19, wherein the processor is configured to perform the remapping operation by:

combining first content stored in a first object and second content stored in a second object into the new object;

generating a new entry for the index that includes an association between the first content and the second content and the new object; and performing a put operation to store the new object in the distributed cloud object storage layer.

* * * * *